US006477064B1

(12) United States Patent
Weng et al.

(10) Patent No.: US 6,477,064 B1
(45) Date of Patent: Nov. 5, 2002

(54) HIGH EFFICIENCY DC-DC POWER CONVERTER WITH TURN-OFF SNUBBER

(75) Inventors: DaFeng Weng, San Jose, CA (US); Jinrong Qian, Plano, TX (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/974,477

(22) Filed: Oct. 10, 2001

(Under 37 CFR 1.47)

(51) Int. Cl.[7] .................. H02M 3/335; H02H 7/122
(52) U.S. Cl. .................. 363/21.04; 363/56.12
(58) Field of Search .................. 363/21.04, 21.05, 363/21.03, 21.12, 21.08, 17, 16, 131, 97, 89, 56.11, 56.12, 45

(56) References Cited

U.S. PATENT DOCUMENTS

| 5,349,514 A | * | 9/1994 | Ushiki et al. .................. 363/97 |
| 5,673,185 A | | 9/1997 | Albach et al. .................. 363/45 |
| 5,694,302 A | | 12/1997 | Faulk .................. 363/16 |
| 6,069,803 A | * | 5/2000 | Cross .................. 363/21.04 |
| 6,314,002 B1 | * | 11/2001 | Qian et al. .................. 363/21.04 |

* cited by examiner

Primary Examiner—Rajnikant B. Patel

(57) ABSTRACT

The invention is a DC-DC converter in which the voltage across the main switch due to the leakage inductance of the transformer is clamped and a pair of capacitors play the role of lossless turn-off snubbers to recycle the leakage energy of the transformer instead of dissipating the energy so as to improve the circuit efficiency.

The DC-DC converter has a voltage source which is connected to a switch. A transformer first primary winding is in series with a first capacitor. This winding and capacitor are connected across the voltage source and switch. A transformer second primary winding is in series with a second capacitor. They are also connected across the voltage source and switch. The transformer first and second primary windings have first and second leakage inductances respectively.

A first diode has one terminal connected to terminals of the transformer first primary winding and the first capacitor. The first diode also has a second terminal connected to the terminals of the transformer second primary winding and the second capacitor. The first diode and first capacitor form a first snubber circuit, while the first diode and second capacitor form a second snubber circuit.

The first and transformer second primary windings providing energy to a transformer secondary winding. In so doing the voltage across the main switch due to the leakage inductance of the transformer is clamped and the leakage energy of the transformer is recovered by charging the first and second capacitors and the delivered output by the magnetizing inductance instead of being dissipated by the first and second snubber circuits. The first and second snubber circuits are lossless and therefore circuit efficiency is improved.

8 Claims, 2 Drawing Sheets

HIGH EFFICIENCY DC-DC POWER CONVERTER WITH TURN-OFF SNUBBER

BACKGROUND OF INVENTION

1. Field of the Invention

The invention relates to a DC-DC power converter. More specifically, the invention relates to a converter in which the voltage across the main switch due to the leakage inductance of the transformer is clamped and a pair of capacitors play the role of lossless turn-off snubbers to recycle the leakage energy of the transformer instead of dissipating the energy so as to improve the circuit efficiency.

2. Description of the Related Art

A well-known conventional DC/DC flyback converter is shown in FIG. 1, where Lk 10 is the leakage inductance of the transformer T 12. The typical switching waveforms of FIG. 1 are shown in FIG. 2. When switch S 14 is turned off at t2, the leakage current charges the parasitic output capacitance of switch S 14 (output capacitance of S is not shown in FIG. 1), which causes a high voltage spike across switch S 14. After the leakage energy is completely released, the voltage across switch S 14 reaches its steady-state value. As a result, a high voltage rating for switch S 14 is required.

To eliminate this voltage spike, a number of circuit topologies have been reported in the literature. Among them, the R-C-D snubber, shown in FIG. 3 is one of the most popular ways to minimize the voltage spike and decrease dv/dt as shown in FIG. 2. The snubber circuit consists of diode D1 20, capacitor Cs 22 and resistor Rs 24. When switch S 14 is turned off, the leakage current in Lk 10 flows through diode D1 20 and charges capacitance Cs 22. The voltage across Cs 22 will change from zero to a clamped voltage so as to clamp the voltage across switch S 14. When switch S 14 turns on, the energy stored in Cs 22 is dissipated by the the snubber resistor Rs 24 through conduction of switch S 14. In other words, the leakage energy of the transformer is first charged to Cs 22 and then is dissipated by the resistor Rs 24. Therefore, the leakage energy is dissipated by the snubber which limits the circuit efficiency. This means the voltage clamp is achieved at the expense of low conversion efficiency.

SUMMARY OF THE INVENTION

The invention is a DC-DC converter in which the voltage across the main switch due to the leakage inductance of the transformer is clamped and a pair of capacitors play the role of lossless turn-off snubbers to recycle the leakage energy of the transformer instead of dissipating the energy so as to improve the circuit efficiency.

The DC-DC converter has a voltage source that is connected to a switch. A transformer first primary winding is in series with a first capacitor. This first winding and first capacitor are connected across the voltage source and switch. A transformer second primary winding is in series with a second capacitor. They are also connected across the voltage source and switch. The transformer first and second primary windings have first and second leakage inductances respectively.

A first diode has one terminal connected to terminals of the transformer first primary winding and the first capacitor. The first diode also has a second terminal connected to the terminals of the transformer second primary winding and the second capacitor. The first diode and first capacitor form a first snubber circuit. The first diode and second capacitor form a second snubber circuit.

The transformer first and second primary windings provide energy to a transformer secondary winding. In so doing, the voltage across the main switch due to the leakage inductance of the transformer is clamped and the leakage energy of the transformer is recovered by charging the first and second capacitors and the delivered output by the magnetizing inductance instead of being dissipated by the first and second snubber circuits. The first and second snubber circuits are lossless and therefore circuit efficiency is improved.

The advantage of the inventive DC-DC converter is that the voltage across the main switch due to the leakage inductance of the transformer is clamped. In addition, the leakage energy is full recovered and directly transferred to the load, instead of being dissipated as in the snubber circuits in the prior art. A pair of capacitors play the role of lossless turn-off snubbers to recycle the leakage energy of the transformer instead of dissipating the energy so as to improve the circuit efficiency. As a result, the invented circuit has potential high power conversion efficiency and low cost.

Another objective of the invention is to use as few components as possible and use only one active switch to reduce the cost.

DETAILED DESCRIPTION OF THE INVENTION

Figure 1:
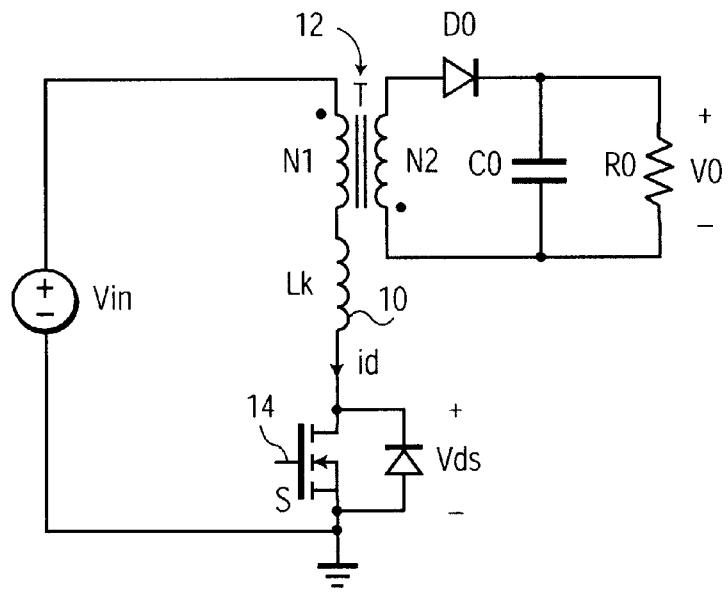
FIG. 1 shows a schematic drawing of a conventional DC-DC flyback converter (prior art).
Figure 2:
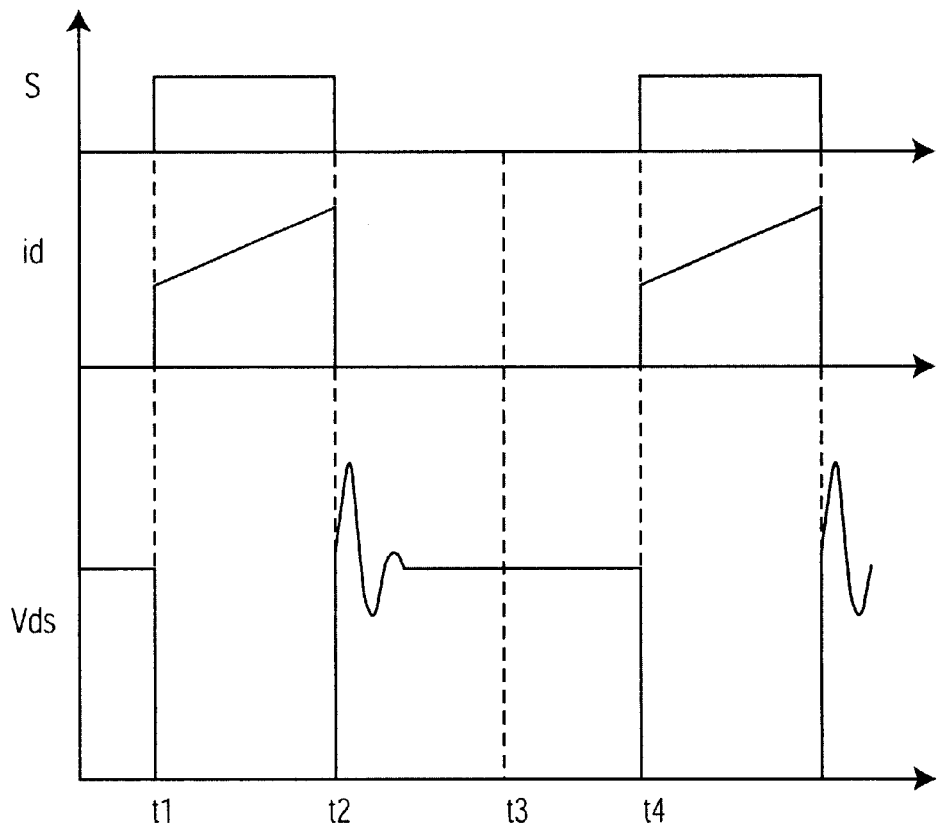
FIG. 2 shows the switching waveforms of FIG. 1
Figure 3:
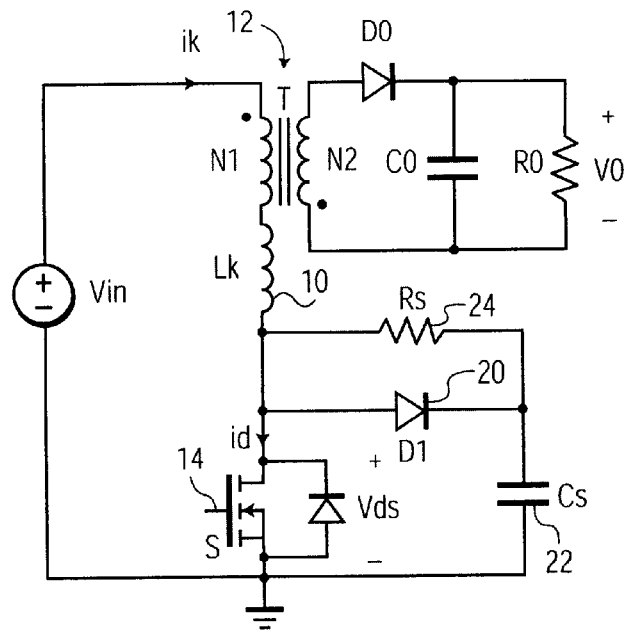
FIG. 3 shows a detailed schematic drawing of a DC-DC flyback converter with R-C-D Snubber (prior art).
Figure 4:
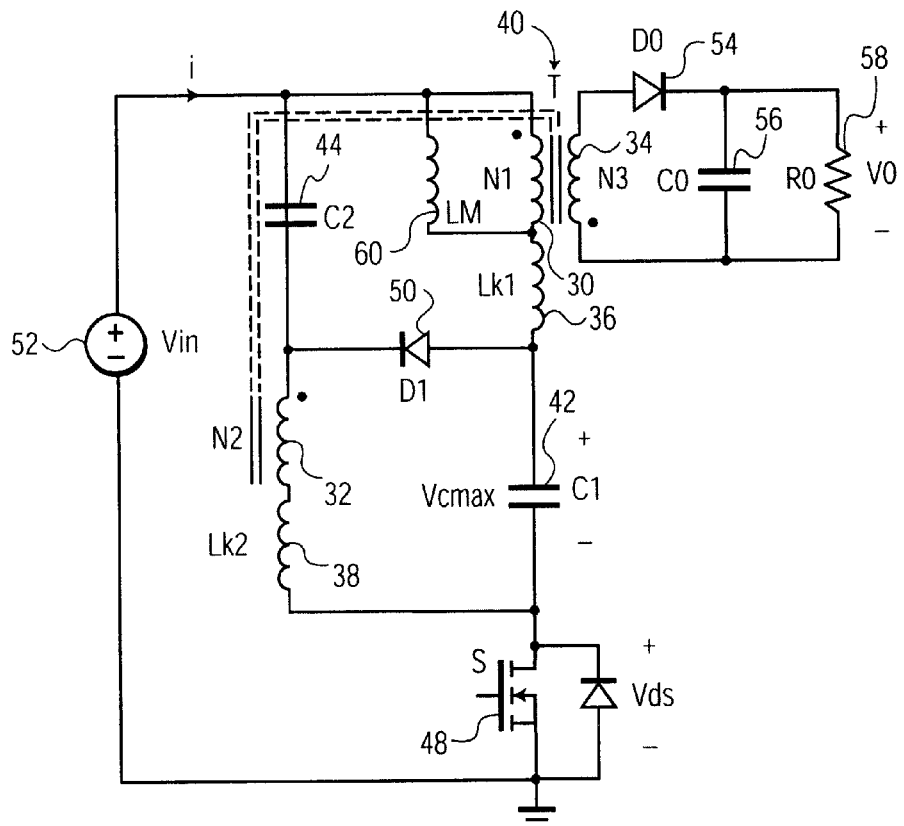
FIG. 4 shows a detailed schematic drawing of the invented DC-DC converter with turn-off snubber.

The inventive circuit is shown in FIG. 4. The transformer T 40 has two primary windings (i.e. first and second) N1 30 and N2 32, respectively, and one (i.e. first) secondary winding N3 34. The windings N1 30 and N2 32 have the same number of turns. LK1 36 and LK2 38 (LK1=LK2) are the first and second leakage inductances, respectively, of two primary windings N1 30 and N2 32 in transformer T 40. First and second capacitors C1 42 and C2 44, respectively, (C1 42=C2 44) are used to clamp the voltage across switch S 48 during the switch off period, recycle leakage energy, and play the role of snubber function. First diode D1 50 is in series with two windings N1 30 and N2 32 to provide a one-direction power path when switch S 48 turns on. Second diode Do 54 is the output rectifier and capacitor Co 56 is the output filter capacitor to reduce the output voltage ripple. Resistor Ro 58 with voltage Vo across it represents the load on the converter. Switch S 48 is a power semiconductor switch which for example could be a MOSFET or an insulated gate bipolar transistor (IGBT).

In FIG. 4, diode D1 50 and capacitor C1 42 is used as a first snubber circuit for winding N2 32's leakage inductor Lk2 38. D1 50 and C2 44 are used as a second snubber circuit for leakage inductor Lk1 36 of winding N1 30. There is no resistive component in these snubber circuits. When switch S 48 turns off the leakage energy stored in Lk1 36 is transferred to C2 44 through D1 50 while leakage energy stored in Lk2 38 is transferred to capacitor C1 42. No energy loss occurrs during this energy transfer. When switch S 48 turns on. There is a circuit loop composed of Vin-N1-Lk1-

C1-S so that the energy stored in C1 42 is transferred to the magnetizing inductance Lm 60 in winding N1 30. Similarly, there is another circuit loop consisting of Vin-C2-N2-Lk2 and S 48 in which the energy stored C2 44 is transferred to the magnetizing inductance Lm 60, which is eventually delivered to the output when S 48 turns off. The snubber circuits are lossless, and do not dissipate transformer leakage energy as does the snubber circuit in the prior art. Therefore, the snubber circuits in the invented circuit acts as lossless turned off snubbers which improve the system efficiency.

As switch S 48 turns on, capacitors C1 42 and C2 44 are in series with primary windings N1 30 and N2 32 because diode D1 50 is reversed biased. Two branches of C1 42-N1 30 and C2 44-N2 32 are independently parallel, and are connected to the input voltage source 52 through switch S 48. For C1 42-N1 30 branch, capacitor C1 42, leakage inductor Lk1 36, and magnetizing inductance Lm 60 form a resonant tank. Here, the transformer is modeled as a magnetizing inductance with an ideal transformer in this figure. The energy stored in capacitor C1 42 is transferred to the magnetizing inductance, and voltage across winding N1 30 decreases. When the voltage across N1 30 is equal to half of the input voltage Vin, diode D1 50 is turned on and the voltage across C1 42 is clamped to half of the input voltage Vin 52. The magnetizing inductance Lm 60 is shown in parallel with primary winding N1 30. The magnetizing inductance Lm 60 could be reflected to winding N2 32 with the same value if N1=N2 because they are coupled. The power is delivered to the output through the magnetizing inductance to the secondary side because the magnetizing inductance Lm 60 can also be reflected to the secondary winding (i.e. N3 34) which is connected to the load 58 through the output diode 54.

For the circuit branch C2 44 and N2 32, the operation is the same as the branch of C1 42 and N1 30. Once the winding voltage across N1 30 and N2 32 is equal to the half of the input voltage, the input voltage source Vin 52 provides energy to the magnetizing inductance Lm 60 and the magnetizing current increases linearly until switch S 48 turns off.

As switch S 48 turns off, because diode D1 50 is still turned on, the total voltage across C1 42 and C2 44 is Vin. The magnetizing current along with the leakage inductor current of winding N1 flows through diode D1 50 and charges capacitor C2 44, and while the magnetizing current along with the leakage inductor current of winding N2 32 flows through diode D1 50 and charges capacitor C1 42. As a result, the voltage across switch S 48 is clamped by the capacitors C1 42 and C2 44. It is capacitors C1 42 and C2 44 that limit the voltage rise rate across switch S 48 to reduce the switching turn-off loss. This process continues until the voltages across windings N1 30 and N2 32 are equal to the voltage Vcx $$\text{where } \left(V_{cx} = -\frac{N1}{N3} \cdot V_0\right),$$

where $D_0$ 54 begins to conduct. After Do 54 turns on, the magnetizing energy is then transferred to the output, and the magnetizing current linearly decreases. Meanwhile, the energy stored in leakage inductance Lk1 36 and Lk2 38 is transferred to capacitors C1 42 and C2 44 instead of being dissipated as with the prior art snubber circuits. As the currents in Lk1 36 and Lk2 38 decrease to zero, diode D1 50 is turned off, and the voltage on C1 42 and C2 44 reach the maximum value, Vcmax.

$$V_{c\,max} = \frac{N1}{N3} \cdot V_0 + I_{kp}\sqrt{L_{k1}}\Big/C_1$$

where $I_{kp}$ is the peak current in the leakage inductor Lk1 36 or Lk2 38.

The maximum voltage across switch S 48 is $$V_{ds\,max} = V_{in} + \frac{N1+N2}{N3} \cdot V_0 + I_{kp}\sqrt{L_{k1}}\Big/C_1$$

It is shown that the leakage energy is full recovered and directly transferred to the load, instead of being dissipated by the circuit compared with the circuits in the prior art.

Two capacitors C1 42 and C2 44 are not only used to recycle the leakage energy but also to play the role of lossless turn-off snubber function. As a result, the invented circuit has potential high power conversion efficiency and low cost.

Another advantage is that the voltage across the main switch due to the leakage inductance of the transformer is clamped. Still another advantage is that the circuit uses only one active switch and only a few components.

While the preferred embodiments of the invention have been shown and described, numerous variations and alternative embodiments will occur to those skilled in the art. Accordingly, it is intended that the invention be limited only in terms of the appended claims.

I claim:

1. A DC-DC converter comprising, a voltage source cooperating with a switch, a transformer first primary winding in series with a first capacitor, said transformer first primary winding and first capacitor connected across said voltage source and said switch, said transformer first primary winding having a first leakage inductance a transformer second primary winding in series with a second capacitor, said transformer second primary winding and second capacitor connected across said voltage source and said switch, said transformer second primary winding having a second leakage inductance a first diode having one terminal connected to terminals of said transformer first primary winding and said first capacitor, said first diode having a second terminal connected to terminals of said transformer second primary winding and said second capacitor, said first diode and said first capacitor forming a first snubber circuit, said first diode and said second capacitor forming a second snubber circuit said transformer first and second primary windings and said transformer secondary winding included in said transformer, said transformer having a magnetizing inductance providing a delivered output to said transformer secondary winding, wherein the voltage across said switch due to the leakage inductance of the transformer first and second primaries is clamped and the leakage energy of said transformer is recovered by charging said first and second capacitors and said delivered output by said magnetizing inductance instead of being dissipated by said first and second snubber circuits so that said first and second snubber circuits are lossless and circuit efficiency is improved.

2. The DC-DC converter of claim 1 in which said magnetizing inductance is in parallel with one of said transformer windings.

3. The DC-DC converter of claim 1 in which said magnetizing inductance is in parallel with said first transformer primary.

4. The DC-DC converter of claim 1 in which said transformer secondary winding is in series with a second diode.

5. The DC-DC converter of claim 4 having a parallel filter capacitor and load connected across said transformer secondary winding and said second diode.

6. The DC-DC converter of claim 1 in which said switch is a power semiconductor switch.

7. The DC-DC converter of claim 6 in which said power semiconductor switch is a MOSFET.

8. The DC-DC converter of claim 6 in which said power semiconductor switch is an insulated gate bipolar transistor (IGBT).

* * * * *